United States Patent [19]
Thommes et al.

[11] Patent Number: 6,160,722
[45] Date of Patent: Dec. 12, 2000

[54] UNINTERRUPTIBLE POWER SUPPLIES WITH DUAL-SOURCING CAPABILITY AND METHODS OF OPERATION THEREOF

[75] Inventors: James Thommes, San Diego, Calif.; Robert W. Johnson, Jr.; William J. Raddi, both of Raleigh, N.C.

[73] Assignee: Powerware Corporation, Raleigh, N.C.

[21] Appl. No.: 09/401,423

[22] Filed: Sep. 22, 1999

Related U.S. Application Data

[63] Continuation-in-part of application No. 09/374,180, Aug. 13, 1999.

[51] Int. Cl.[7] .............................. H02M 5/45; H02M 5/458
[52] U.S. Cl. .................................. 363/37; 363/58; 307/68
[58] Field of Search ..................................... 363/37, 56, 58, 363/17, 24, 132, 134; 307/66, 68

[56] References Cited

U.S. PATENT DOCUMENTS

| | | | |
|---|---|---|---|
| 5,111,374 | 5/1992 | Lai et al. | 363/37 |
| 5,111,376 | 5/1992 | Mehl | 363/71 |
| 5,229,650 | 7/1993 | Kita et al. | 307/66 |
| 5,502,630 | 3/1996 | Rokhvarg | 363/84 |
| 5,644,483 | 7/1997 | Peng et al. | 363/37 |
| 5,710,696 | 1/1998 | Reynolds et al. | 363/37 |
| 5,781,422 | 7/1998 | Lavin et al. | 363/37 |
| 5,978,236 | 11/1999 | Faberman et al. | 307/66 |
| 6,005,362 | 12/1999 | Enjeti et al. | 363/37 |
| 6,014,322 | 1/2000 | Higashi et al. | 363/65 |

*Primary Examiner*—Peter S. Wong
*Assistant Examiner*—Bao Q. Vu
*Attorney, Agent, or Firm*—Myers Bigel Sibley & Sajovec

[57] ABSTRACT

An uninterruptible power supply (UPS) includes an AC source port configured to connect to an AC power source, a DC source port configured to connect to a DC power source and a load port configured to connect to a load. A rectifier circuit is operative to selectively couple the AC source port to first and second voltage busses through a first inductance. An inverter circuit is operative to selectively couple the load port to the first and second voltage busses through a second inductance. A bidirectional DC source coupling circuit is operative to couple the DC source port to the first and second voltage busses to provide bidirectional power transfer therebetween, preferably such that a voltage at the DC source port is maintained in a substantially fixed proportion to first and second DC voltages at respective ones of the first and second voltage busses. In one embodiment, the bidirectional DC source coupling circuit includes a transformer having first and second inductively coupled windings, the first winding having first and second end taps and a center tap coupled to the neutral bus. A switching circuit is operative to selectively couple the first end tap of the first winding to the first and second voltage busses. A rectifying circuit couples the second end tap of the first winding to the first and second voltage busses. A bidirectional DC-AC converter circuit is coupled between the second winding and the DC source port. Related operating methods are also discussed.

33 Claims, 10 Drawing Sheets

UNINTERRUPTIBLE POWER SUPPLIES WITH DUAL-SOURCING CAPABILITY AND METHODS OF OPERATION THEREOF

REFERENCE TO PARENT APPLICATION

The present application is a continuation-in-part of U.S. patent application Ser. No. 09/374,180, filed Aug. 13, 1999, the disclosure of which is herein incorporated by reference in its entirety.

FIELD OF THE INVENTION

The present invention relates to electrical power devices and methods of operation thereof, and more particularly, to uninterruptible power supplies (UPSs) and methods of operation thereof.

BACKGROUND OF THE INVENTION

Uninterruptible power supplies (UPSs) are power conversion devices that are commonly used to provide conditioned, reliable power for computer networks, telecommunications networks, medical equipment and the like. UPSs are widely used with computers and similar computing devices, including but not limited to personal computers, workstations, mini computers, network servers, disk arrays and mainframe computers, to insure that valuable data is not lost and that the device can continue to operate notwithstanding temporary loss of an AC utility source. UPSs typically provide power to such electronic equipment from a secondary source, such as a battery, in the event that a primary alternating current (AC) utility source drops out (blackout) or fails to provide a proper voltage (brownout).

Conventional UPSs may be classified into categories. Referring to FIG. 1, a typical off-line UPS disconnects a load from a primary AC source 10 when the primary AC source fails or is operating in a degraded manner, allowing the load to be served from a secondary source such as a battery. The AC power source 10 is connected in series with a switch $S_1$, producing an AC voltage across a load 20 when the switch $S_1$ is closed. Energy storage is typically provided in the form of a storage capacitor $C_S$. The secondary power source, here a battery B, is connected to the load 20 via a low voltage converter 30 and a transformer T. When the AC power source 10 fails, the switch $S_1$ is opened, causing the load to draw power from the battery B. The low voltage converter 30 typically is an inverter that produces a quasi-square wave or sine wave voltage on a first winding $L_1$ of the transformer T from a DC voltage produced by the battery B. The first winding $L_1$ is coupled to a second winding $L_2$ of the transformer T connected across the load 20. When the AC power source is operational, i.e., when the switch $S_1$ is closed, the battery B may be charged using the low-voltage converter 30 or a separate battery charger circuit (not shown).

A line interactive (LIA) UPS topology is illustrated in FIG. 2. Here, the transformer T has a third winding $L_3$ that may be connected in series with the load 20 using switches $S_2$, $S_3$ to "buck" or "boost" the voltage applied to the load 20. As with the offline UPS topology of FIG. 1, when the AC power source 10 fails, the switch $S_1$ can be opened to allow the load 20 to run off the battery B.

As illustrated in FIG. 3, a typical on-line UPS includes a rectifier 40 that receives an AC voltage from an AC power source 10, producing a DC voltage across a storage capacitor $C_S$ at an intermediate node 45. An inverter 50 is connected between the intermediate node 45, and is operative to produce an AC voltage across a load 20 from the DC voltage. As shown, a battery B is connected to the intermediate node 45 via a DC/DC converter 60, supplying auxiliary power. Alternatively, the DC/DC converter can be eliminated and a high-voltage battery (not shown) connected directly to the intermediate node 45.

Each of these topologies may have disadvantages. For example, typical conventional on-line and LIA UPSs for 60 Hz applications use 60 Hz magnetic components (e.g., transformers and inductors) that are sized for such frequencies, and thus may be large, heavy and expensive. LIA UPSs often exhibit step voltage changes that can affect the performance of the load. Conventional off-line, LIA and on-line UPSs often use large storage capacitors, which tend to be bulky and expensive, in order to maintain an acceptable output voltage under heavy loading conditions. Moreover, because conventional UPSs are typically designed to operate in only one of the above-described off-line, LIA or on-line modes, sellers of UPSs may be required to maintain large inventories including several different types of UPSs in order to meet a variety of different customer applications.

SUMMARY OF THE INVENTION

In light of the foregoing, it is an object of the present invention to provide improved uninterruptible power supplies (UPSs).

It is another object of the present invention to provide UPSs that can be operated in a number of different modes.

It is yet another object of the present invention to provide UPSs that can utilize smaller magnetic components and storage capacitors.

These and other objects, features and advantages may be provided according to the present invention by UPSs which include a variable-boost rectifier circuit that selectively couples and AC source port to first and second voltage busses, a variable-buck inverter circuit that selectively couples the first and second voltage busses to a load port, and a bidirectional DC source coupling circuit that couples the first and second voltage busses to a DC power source, such as a battery, to provide bidirectional power transfer between the DC power source and the first and second voltage busses. Preferably, the DC source coupling circuit provides inductive bidirectional power transfer between a DC source port at which the DC power source may be connected and the first and second voltage busses such that voltages at the first and second voltage busses and a voltage at the DC source port are maintained in a substantially fixed proportion to one another. The bidirectional DC source coupling circuit can enable the DC source to either receive current when needed (e.g., when the DC source requires charging) or provide current when needed (e.g., when the variable-boost rectifier is unable to provide sufficient current to maintain a nominal voltage at the load port).

According to an aspect of the present invention, power provided from the DC source can be combined with power from the AC source to provide a supplemented mode of operation that may be particularly advantageous for extending battery capacity during brownout conditions. A control circuit may control the rectifier circuit, the inverter circuit and the DC source coupling circuit such that power is transferred to the load port primarily from the AC source until power demand at the load port causes a current at the AC source port to reach a current limit. When the power demand at the load port further increases, increasing power is transferred from the DC source port to the load port. The rectifier and inverter circuits can also be controlled to provide charging of a battery at the DC source port through the DC source coupling circuit, while concurrently maintaining a nominal voltage at the load port.

In particular, according to one embodiment of the present invention, an uninterruptible power supply (UPS) includes an AC source port configured to connect to an AC power source and a load port configured to connect to a load. A rectifier circuit is operative to selectively couple the AC source port to first and second voltage busses through a first inductance. An inverter circuit is operative to selectively couple the load port to the first and second voltage busses through a second inductance. A bidirectional DC source coupling circuit is operative to couple a DC power source to the first and second voltage busses to provide bidirectional power transfer therebetween. Preferably, the DC source coupling circuit provides inductive power transfer between a DC source port (at which a DC power source may be connected) and the first and second voltage busses such that a voltage at the DC source port is maintained in a substantially fixed proportion to first and second DC voltages at respective ones of the first and second voltage busses.

According an embodiment of the present invention, the UPS includes a control circuit operative to generate a rectifier control signal and an inverter control signal responsive to at least a load voltage at the load port. The rectifier circuit is responsive to the rectifier control signal to control coupling of the AC source port to the first and second voltage busses. The inverter circuit is responsive to the inverter control signal to control coupling of the load port to the first and second voltage busses.

According to another embodiment of the present invention, the AC source port includes a phase bus and a neutral bus, and the bidirectional DC source coupling circuit includes a balancer circuit coupled between the first and second voltage busses and operative to selectively couple the first and second voltage busses to the neutral bus through a transformer responsive to a balancer control signal. The control circuit is operative to generate the balancer control signal such that the first and second DC voltages are constrained to have substantially equal magnitudes.

According to yet another aspect of the present invention, the control circuit is responsive to the voltage at the load port to control the rectifier circuit and the inverter circuit such that current at the AC source port varies up to a current limit to maintain the load voltage at the nominal voltage. When the current at the AC source port reaches the current limit, power may be transferred to the load port from both the AC source port and the DC source port to maintain the load terminal at the nominal voltage. The control circuit may further be operative to limit the current at the AC source port.

In one embodiment of the present invention, the rectifier circuit includes a first inductor having a first terminal coupled to the phase bus. A first switch is responsive to a first switch control signal to couple and decouple a second terminal of the first inductor and the first voltage bus, and a second switch is responsive to a second switch control signal to couple and decouple the second terminal of the first inductor and the second voltage bus. The inverter circuit includes a second inductor having a first terminal coupled to the load bus. A third switch is responsive to a third switch control signal to couple and decouple a second terminal of the second inductor and the first voltage bus. A fourth switch is responsive to a fourth switch control circuit to couple and decouple the second terminal of the second inductor and the second voltage bus. The control circuit is operative to generate the first, second, third and fourth switch control signals responsive to at least the load voltage at the load port.

According to yet another aspect of the present invention, the bidirectional DC source coupling circuit includes a transformer having first and second inductively coupled windings, the first winding having first and second end taps, and a center tap coupled to the neutral bus. A switching circuit is operative to selectively couple the first end tap of the first winding to the first and second voltage busses. A rectifying circuit couples the second end tap of the first winding to the first and second voltage busses. A bidirectional DC-AC converter circuit is coupled between the second winding and the DC source port. The DC-AC converter circuit preferably includes a full bridge switching circuit that selectively couples first and second terminals of the DC source port to first and second taps of the second winding of the transformer.

In another embodiment of the present invention, a UPS includes an AC source port configured to connect to an AC power source, the AC source port including a phase bus and a neutral bus. A DC source port is configured to connect to a DC power source. A load port is configured to connect to a load, and includes a load bus and the neutral bus. A first switching circuit is operative to selectively couple the phase bus to first and second voltage busses through a first inductance. A second switching circuit is operative to selectively couple the load bus to the first and second voltage busses through a second inductance. A transformer includes first and second inductively coupled windings, the first winding including a center tap coupled to the neutral bus. A third switching circuit is operative to selectively couple the first and second voltage busses to a first end tap of the first winding. A rectifying circuit is operative to rectifyingly couple a second end tap of the first winding to the first and second voltage busses. A DC-AC converter circuit is operative to selectively couple the DC source port to the second winding.

According to method aspects of the present invention, power is selectively transferred power to a load from an AC source and a DC source. The AC source is selectively coupled to first and second voltage busses through a first inductance. The load is selectively coupled to the first and second voltage busses through a second inductance. The DC source is coupled to the first and second voltage busses to provide bidirectional power transfer between the DC source and the first and second voltage busses. Preferably, power is inductively transferred between the DC source and the first and second voltage busses to maintain a voltage at the DC source in a substantially fixed proportion to first and second DC voltages at respective ones of the first and second voltage busses. The first and second voltage busses are preferably selectively coupled to a neutral bus through a transformer such that the first and second DC voltages are constrained to have substantially equal magnitudes. According to one method aspect, the AC source port is selectively coupled to the first and second voltage busses such that current at the AC source varies up to a current limit to maintain the load voltage at the nominal voltage. When the current at the AC source port reaches the current limit and the voltage, power is transferred to the load port from both the AC source and the DC source to maintain the load voltage at the nominal voltage.

Improved UPSs and methods of operation thereof may thereby be provided.

DETAILED DESCRIPTION OF PREFERRED EMBODIMENTS

Figure 1:
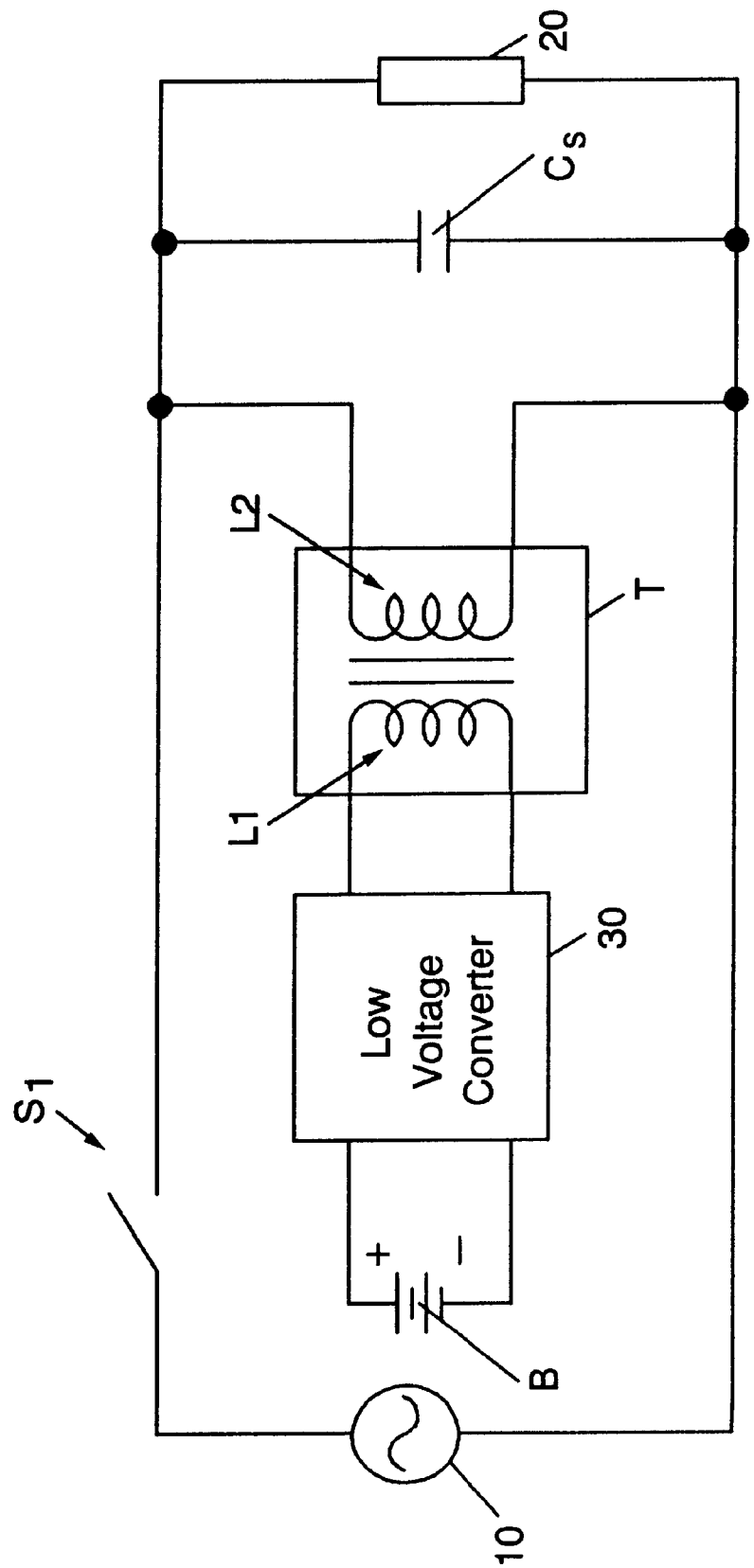
FIGS. 1–3 are schematic diagrams of conventional uninterruptible power supplies (UPSs).
Figure 2:
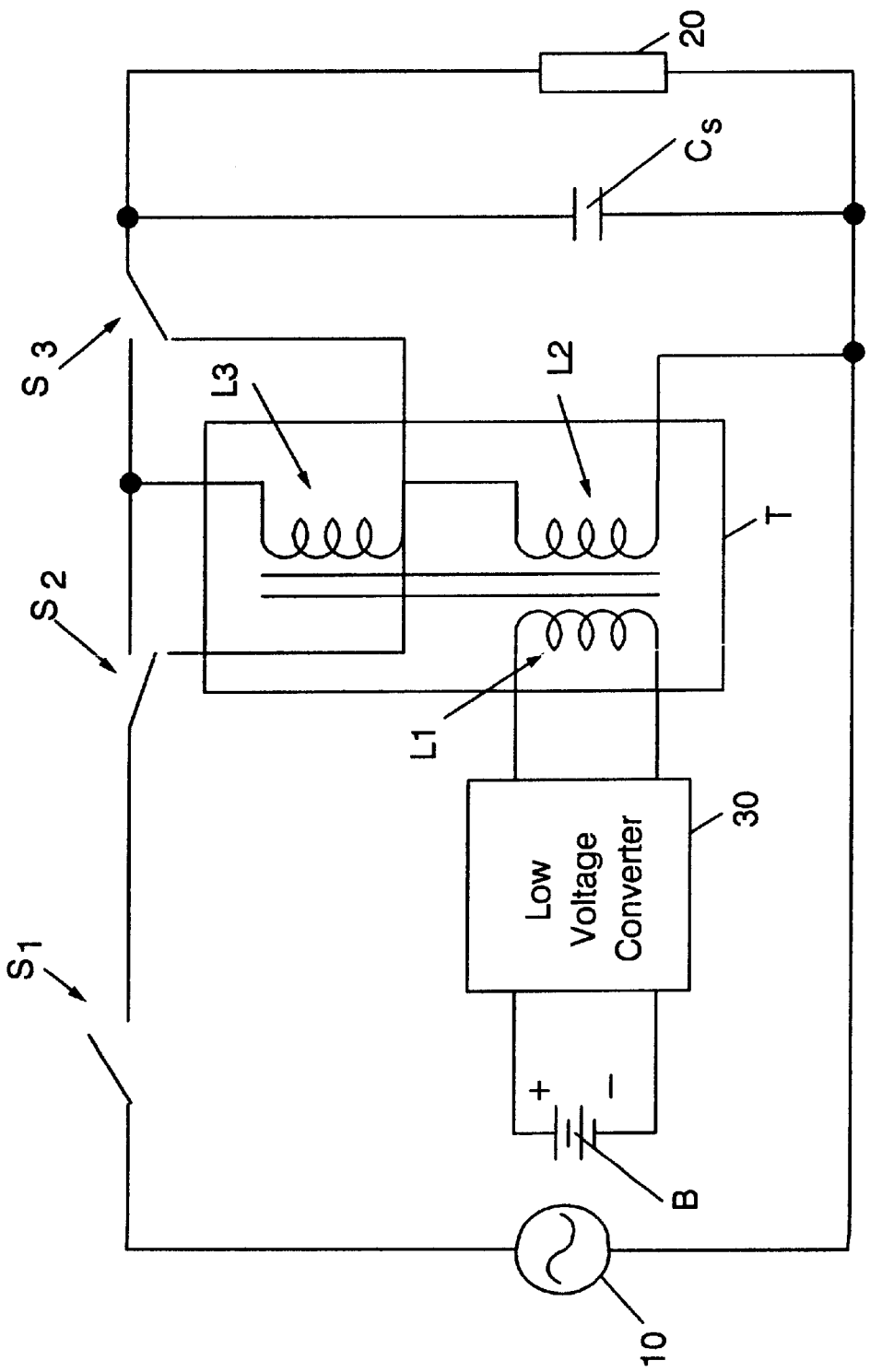
Figure 3:
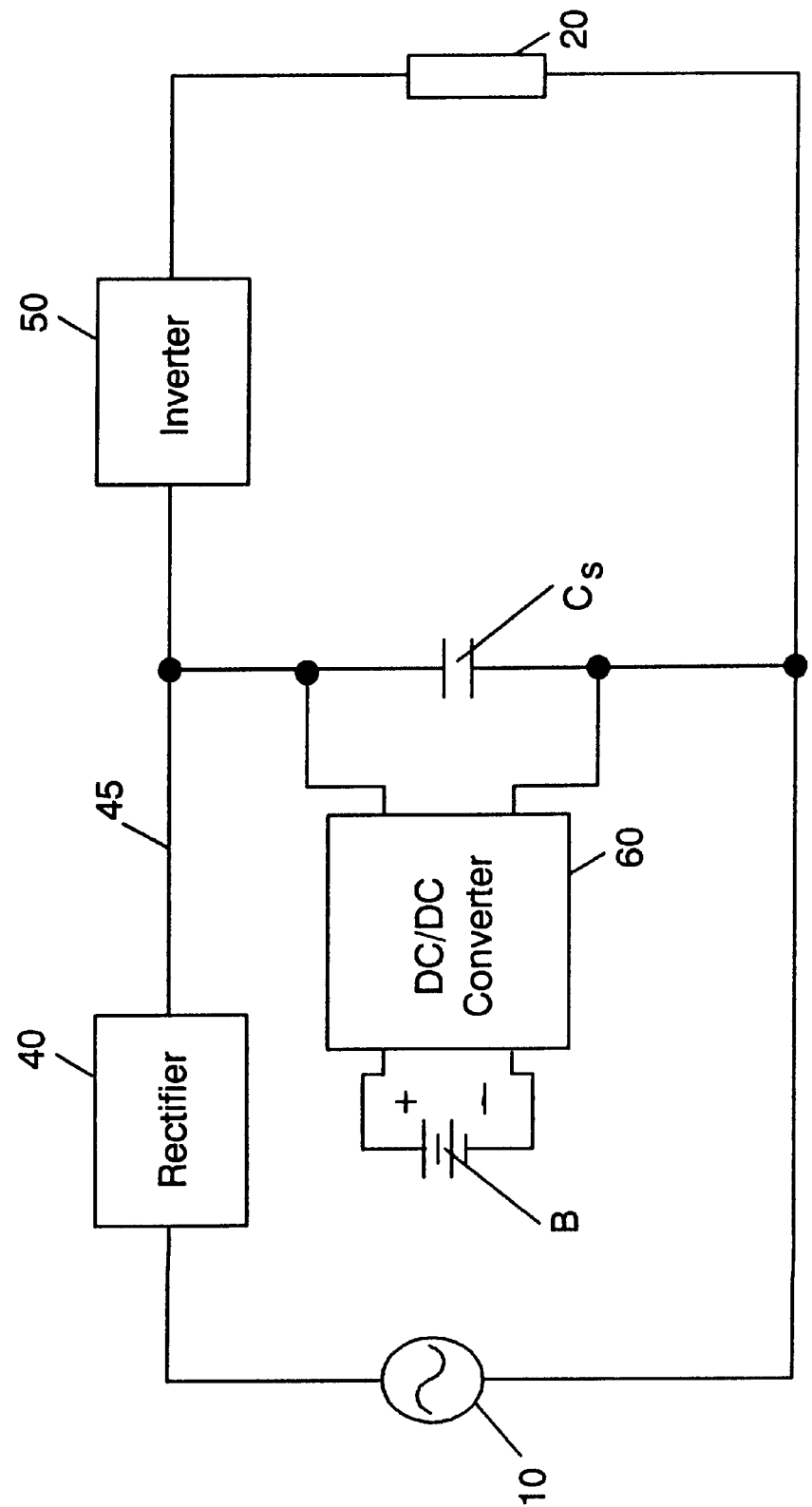

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 4:
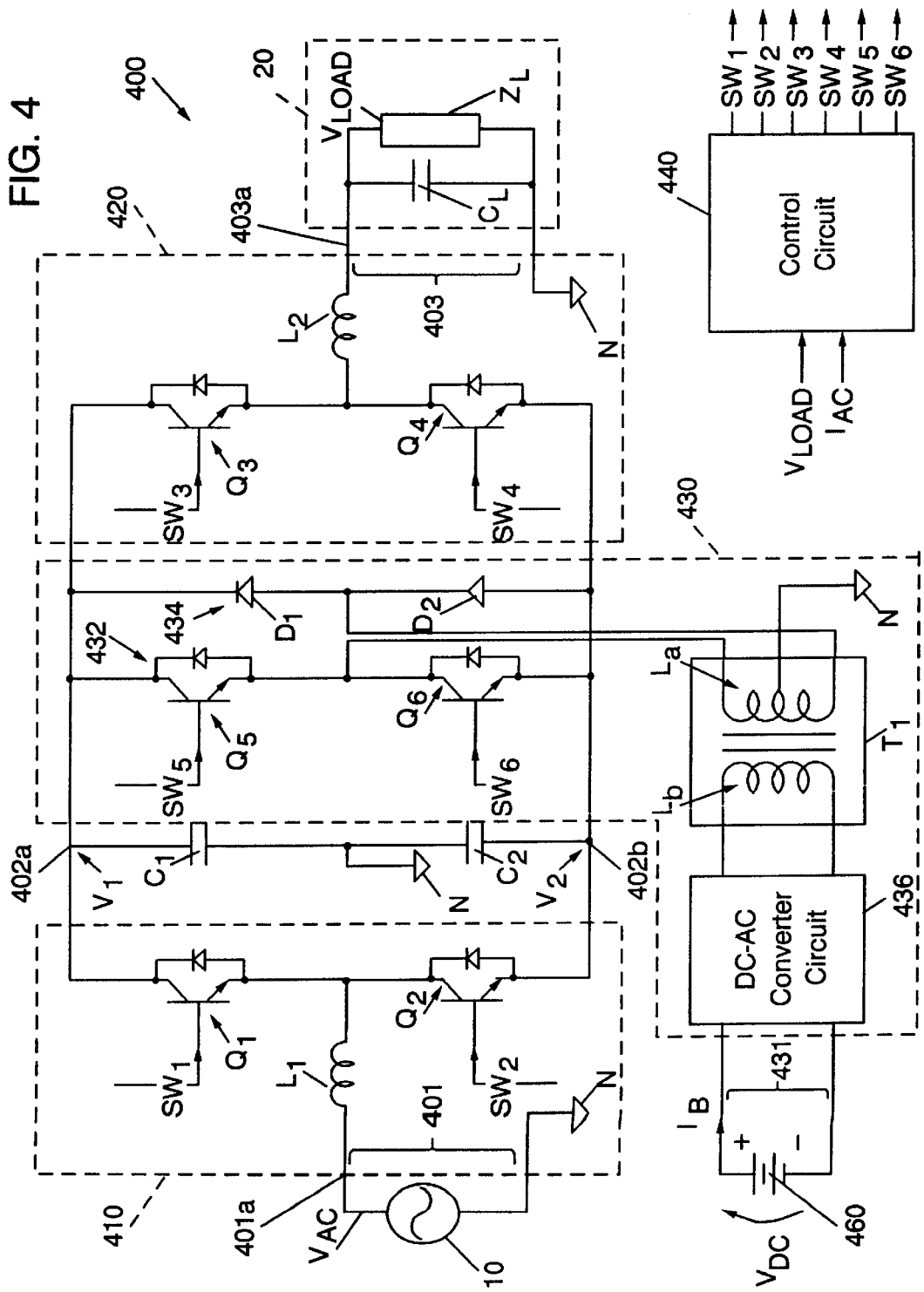
FIGS. 4–5 are schematic diagrams illustrating UPSs according to embodiments of the present invention.

FIG. 4 is a schematic diagram illustrating an uninterruptible power supply (UPS) 400 according to an embodiment of the present invention. The UPS 400 includes a variable-boost rectifier circuit 410 that is configured to connect to an AC power source 10 at an AC source port 401. The variable-boost rectifier circuit 410 is operative to selectively couple a phase bus 401a of the AC source port 401 to first and second voltage busses voltage busses 402a, 402b via a first inductor $L_1$, responsive to first and second switch control signals $SW_1$, $SW_2$ generated by a control circuit 440 applied to first and second switching transistors $Q_1$, $Q_2$. The first and second voltage busses 402a, 402b are coupled to a neutral bus N by first and second capacitors $C_1$, $C_2$. The UPS 400 further includes a variable-buck inverter circuit 420 that is operative to selectively couple the first and second voltage busses 402a, 402b to a load bus 403a of a load port 403 at which a load 20 is connected (here shown as including capacitance $C_L$ and generalized impedance $Z_L$) via a second inductor $L_2$, responsive to third and fourth switch control signals $SW_3$, $SW_4$ generated by the control circuit 440 and applied to third and fourth switching transistors $Q_3$, $Q_4$.

The UPS 400 also includes a DC source coupling circuit 430 that is operative to provide bidirectional power transfer between the first and second voltage busses 402a, 402b and a DC source port 431, here shown connected to a battery 460. The DC source coupling circuit 430 includes a balancer circuit 432 including switching transistors $Q_5$, $Q_6$ that are responsive to fifth and sixth switch control signals $SW_5$, $SW_6$ generated by the control circuit 440. The balancer circuit 432 is operative to control the relative magnitudes of first and second DC voltages $V_1$, $V_2$ at the first and second voltage busses 402a, 402b based on the relative duty cycles at which the fifth and sixth transistors $Q_5$, $Q_6$ are operated, as described in the aforementioned incorporated U.S. patent application Ser. No. 09/374,180.

The DC source coupling circuit 430 also includes a transformer $T_1$, having first and second inductively coupled windings $L_a$, $L_b$. A center tap of the first winding $L_a$ is connected to the neutral bus N. A first end tap of the first winding $L_a$ is coupled to the switching transistors $Q_5$, $Q_6$ of the balancer circuit 432. A second end tap of the first winding $L_a$ is connected to a rectifying circuit 434 including respective diodes D1, D2 that connect the second end tap to respective ones of the first and second voltage busses 402a, 402b. A bidirectional DC-AC converter circuit 436 is coupled between the DC source port 431 and the second winding $L_b$.

It will be appreciated that the embodiment of FIG. 4 represents an exemplary implementation, and that other circuit implementations fall within the scope of the present invention. For example, the switching functions of the transistors $Q_1$, $Q_2$, $Q_3$, $Q_4$, $Q_5$, $Q_6$ may be provided by a variety of switching devices including, but not limited to, bipolar transistors, field-effect transistors (FETs), metal oxide semiconductor FETs (MOSFETs), gate turn-on devices (GTOs), and the like. The control circuit 440 may include variety of different components as well, and preferably includes components suitable for controlling the particular type(s) of switching devices used. The functions of the rectifying circuit 434 may be achieved using transistor or other switching devices instead of the diodes $D_1$, $D_2$.

Figure 5:
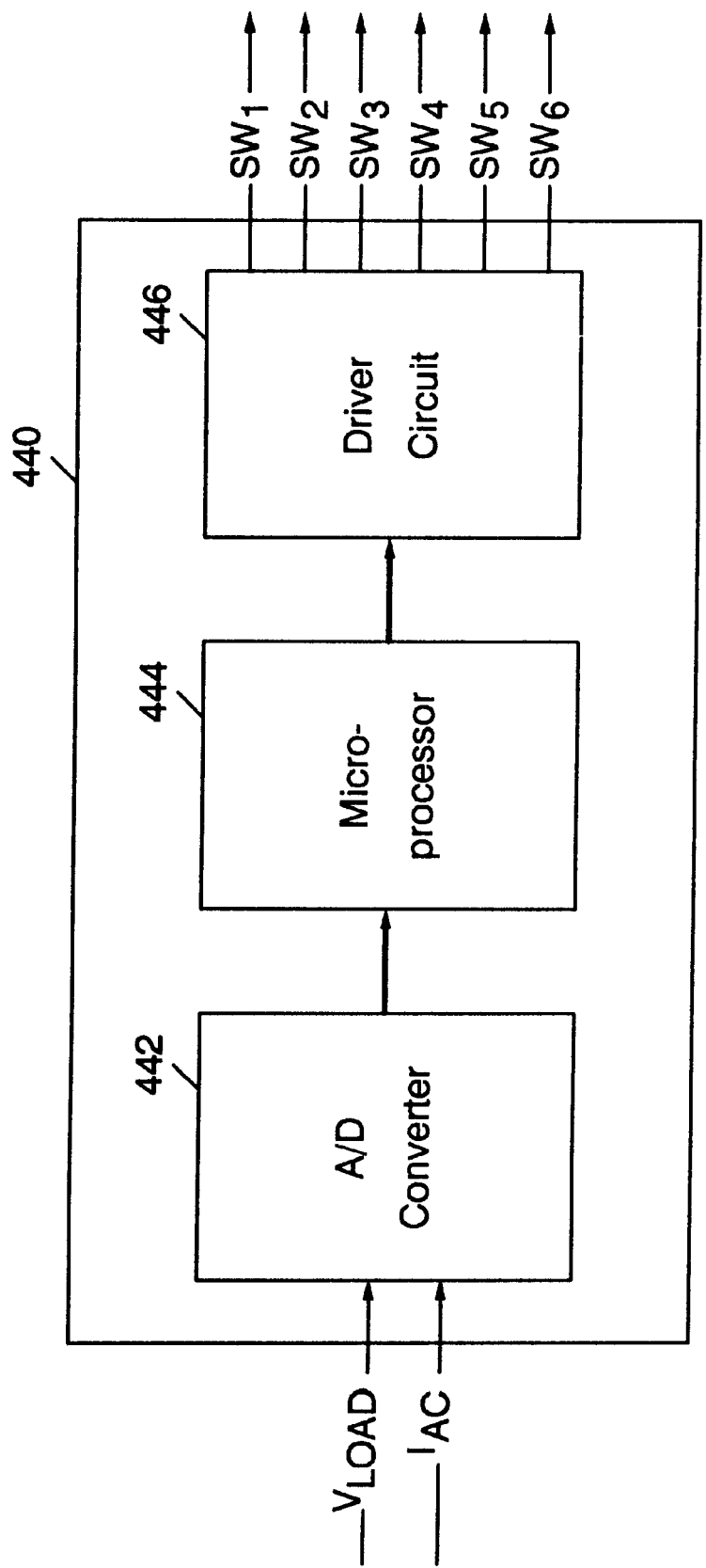

FIG. 5 illustrates an exemplary implementation of the control circuit 440 of FIG. 4. State inputs, including, for example, representations of the voltage $V_{LOAD}$ at the load port 403 and current IAC at the AC source port 401, are received by an analog to digital (A/D) converter 442. For example, the representation of the AC input current $I_{AC}$ may be generated using a current sensing device such as a current transformer (CT) (not shown), and the load voltage $V_{LOAD}$ may be obtained directly, or, more preferably, via buffering circuitry (not shown) that scales the load voltage $V_{LOAD}$ to a lower level suitable for input into the A/D converter 442. The A/D converter 442 samples and converts the state inputs into digital form for transmission to a microprocessor 444 or other computing device. The microprocessor 444 implements a control algorithm based on the state inputs, producing digital driver command signals that are applied to a driver circuit 446 that produces the switch control signals $SW_1$, $SW_2$, $SW_3$, $SW_4$, $SW_5$, $SW_6$.

It will be appreciated that the control circuit 440 illustrated in FIG. 5 is provided for illustrative purposes, and that a variety of other implementations may be used within the scope of the present invention. For example, the driver circuit 446 may include any of a variety of components, preferably components suitable for controlling the particular type(s) of switching devices used in the rectifier, inverter and balancer circuits 410, 420, 432. Functions of the control circuit 440 may be implemented in a number of different ways within the scope of the present invention. For example, functions of the microprocessor 444 may be implemented using discrete logic circuits or programmable logic circuits such as programmable logic devices (PLDs) instead or in conjunction with a microcontroller, microprocessor or similar device. Functions of the A/D converter 442, the microprocessor 444 and the driver circuit 446 may also be combined in one or more devices, such as an application-specific integrated circuit (ASIC), special purpose microcontroller, or a hybrid microcircuit.

Still referring to FIG. 4, the control circuit 440 preferably is operative to control the inverter circuit 420 such that current can flow from the first and second voltage busses 402a, 402b to the load 20 or vice versa, thus making the inverter circuit 420 operate as a four-quadrant converter. The control circuit 440 also preferably controls the rectifier circuit 410 such that is has similar four-quadrant operational characteristics, except that different pulse-width modulation (PWM) patterns preferably are applied to the switching transistors $Q_1$, $Q_2$ of the rectifier circuit 410 than those applied to the switching transistors $Q_3$, $Q_4$ of the inverter circuit 420. The PWM patterns employed for the inverter circuit 420 preferably produce a voltage controlled, current limited output voltage, while the PWM patterns employed for the rectifier circuit 410 preferably provide a controlled current to and from the AC power source 10. The rectifier circuit 410 can be operated such that a current is produced that causes power flow into the UPS 400 from the AC power source 10, or such that a current is produced that causes power flow into the AC power source 10 from the UPS 400.

The control circuit 440 preferably controls the balancer circuit 432 in a manner that constrains the magnitudes of first and second DC voltages $V_1$, $V_2$ on the first and second voltage busses 402a, 402b to be substantially equal. This is achieved by controlling respective first and second rates (e.g., duty cycles) at which the neutral bus N is connected to respective ones of the first and second voltage busses 402a, 402b through a portion of the first winding $L_a$. Specifically, for the embodiment illustrated in FIG. 4, the switching transistors $Q_5$, $Q_6$ of the balancer circuit 432 are preferably operated at respective complementary 50% duty cycles, such that the first and second DC voltages $V_1$, $V_2$ are constrained to be substantially equal in magnitude.

Figure 6:
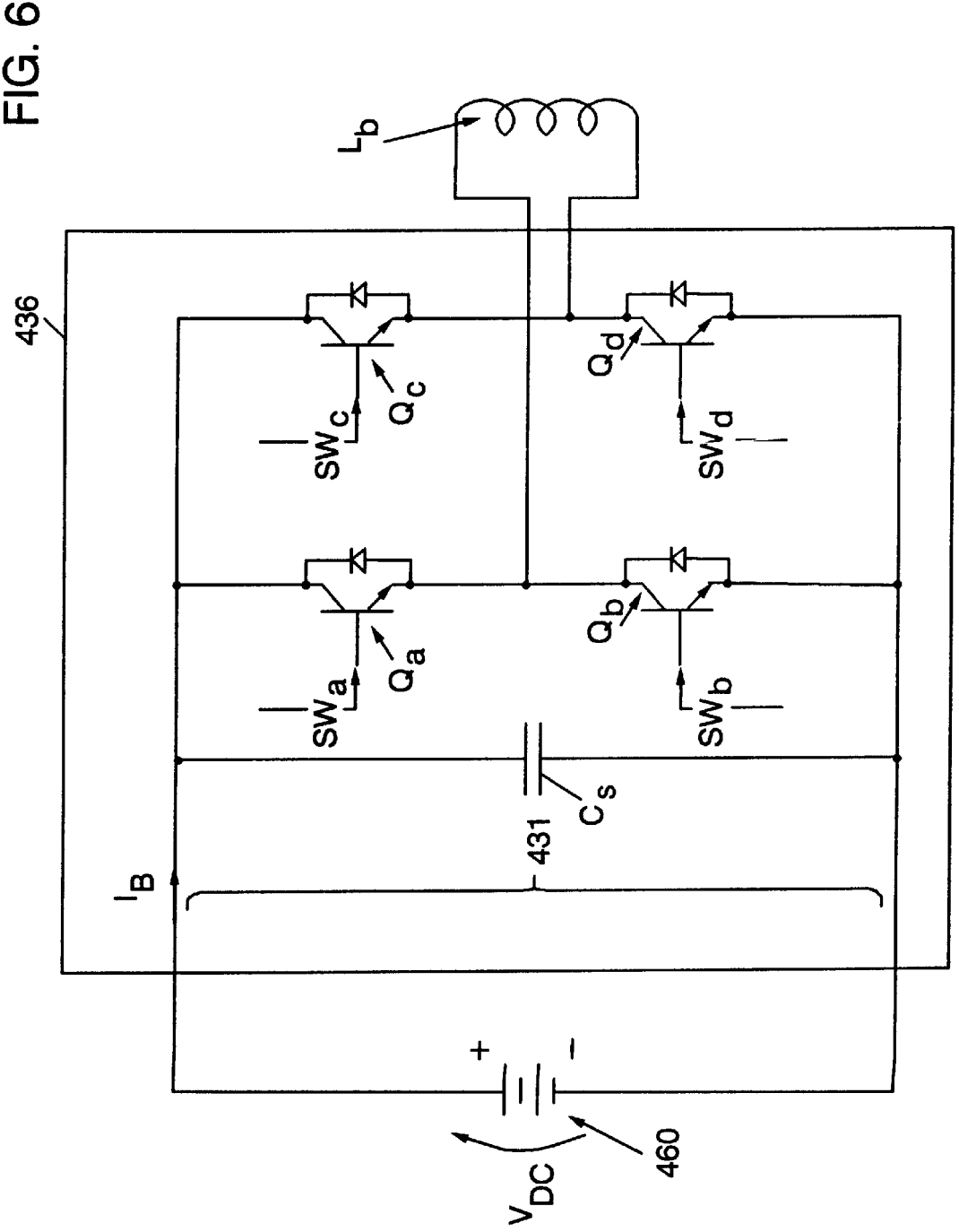
FIG. 6 is a schematic diagram illustrating a DC-AC converter circuit according to an embodiment of the present invention.

FIG. 6 illustrates an exemplary DC-AC converter circuit 436. A storage capacitor $C_s$ is connected across the battery 460. Four switching transistors $Q_a$, $Q_b$, $Q_c$, $Q_d$ are connected in a full bridge configuration between the second transformer winding Lb and the battery 460. The transistors $Q_a$, $Q_b$, $Q_c$, $Q_d$ are controlled by switch control signals $SW_a$, $SW_b$, $SW_c$, $SW_d$ which may also be generated by the control circuit 440 of FIG. 4. Although the switch control signals $SW_a$, $SW_b$, $SW_c$, $SW_d$ may be generated based on a variety of state inputs, such as a sensed voltage of the battery 460, as well as sensed voltages and currents elsewhere in the UPS 400 of FIG. 4, the transistors $Q_a$, $Q_b$, $Q_c$, $Q_d$ preferably are operated such that they provide four quadrant conversion, allowing bidirectional power flow between the battery 460 and the second transformer winding $L_b$.

Figure 7:
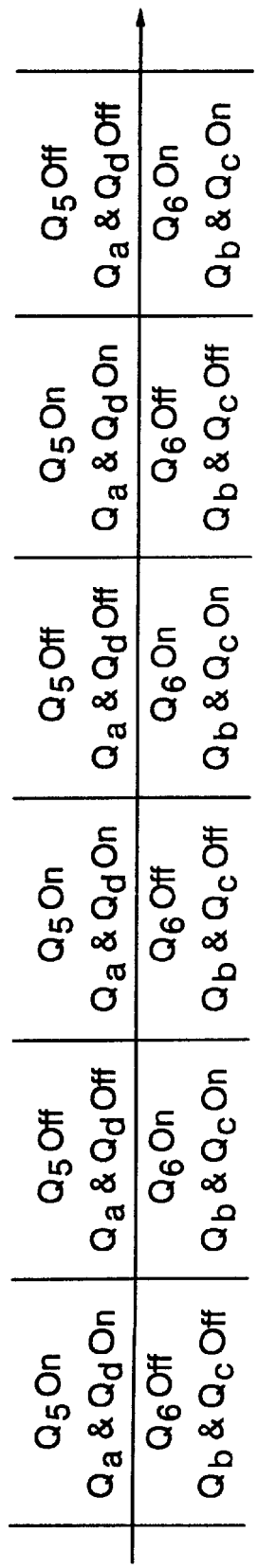
FIG. 7 illustrates exemplary transistor switching patterns for the embodiments of FIGS. 4 and 9.

The transistors $Q_a$, $Q_b$, $Q_c$, $Q_d$ are also preferably operated in synchronism with the transistors $Q_5$, $Q_6$ of the balancer circuit 432. In particular, as shown in FIG. 7, the transistors $Q_a$, $Q_b$, $Q_c$, $Q_d$, $Q_5$, $Q_6$ are preferably operated such that transistors $Q_a$, $Q_d$, $Q_5$ are "on" when transistors $Q_b$, $Q_c$, $Q_6$ are "off", and vice versa. Proper selection of the turns ratio of the transformer $T_1$ vis a vis the voltage characteristics of the battery 460 and the voltage envelope within which the first and second voltage busses 402a, 402b are operated can allow the UPS 400 to operate such that power transfer between the battery 460 and the first and second voltage busses 402a, 402b is effected depending on the charge state of the battery 460, the power demand at the load port 403, and the voltage $V_{AC}$ at the AC source port 401, as described in greater detail below.

It will be appreciated that the embodiment of FIG. 6 represents an exemplary implementation, and that other circuit implementations fall within the scope of the present invention. For example, the switching functions of the transistors $Q_a$, $Q_b$, $Q_c$, $Q_d$ may be provided by any of a number of different switching devices such as those described in relation to FIG. 4, controlled using any of a number of different control circuit implementations, such as ones similar to those described for the switch control circuit 440 of FIG. 5.

Figure 8:
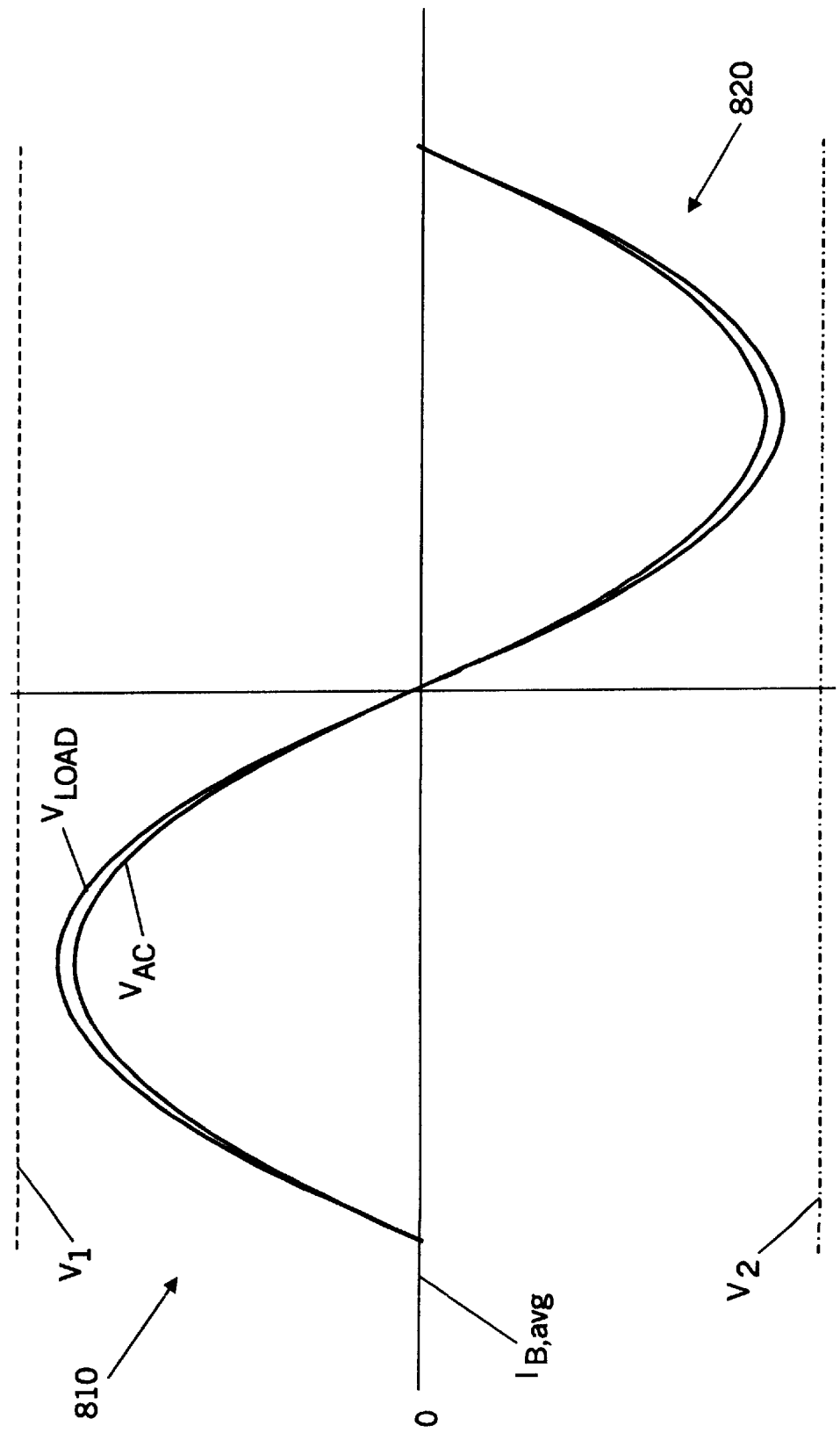
FIGS. 8 and 9A–9C are waveform diagrams illustrating further exemplary operations of the UPS of FIG. 4.

FIG. 8 is a waveform diagram illustrating exemplary operations for the UPS 400 of FIG. 4. For purposes of the discussion of FIG. 8, operation of the UPS 400 of FIG. 4 will be described in terms of the control of the functions of the transistors switches $Q_1$, $Q_2$, $Q_3$, $Q_4$, $Q_5$, $Q_6$ of the rectifier and inverter circuits 410, 420, and more particularly, in terms of the control of "duty cycles" at which the transistors are switched (modulated). As used herein, "duty cycle" generally refers to a percentage of time during a switching cycle period that a switch is in a "closed," i.e., conductive, state. Thus, for example, a switch that is maintained at a 50% duty cycle is intermittently "on" for half of a switching cycle, while a switch approaching a 100% duty cycle, e.g., a 99% duty cycle, is on for nearly all of the switching cycle. It will be understood that, as described herein, the switches discussed may also operate at a 100% duty cycle, i.e., be maintained in an "on" state throughout one or more switching cycles, or at a 0% duty cycle, i.e., be maintained in an "off" state throughout one or more switching cycles.

It will be appreciated that this duty cycle control may be achieved, for example, by application of appropriate control signals to appropriate switching components. For example, in the embodiment of FIG. 4, duty cycle control of the switching transistors $Q_1$, $Q_2$, $Q_3$, $Q_4$, $Q_5$, $Q_6$ may be achieved by the control circuit 440 applying appropriate base drive signals to the switching transistors $Q_1$, $Q_2$, $Q_3$, $Q_4$, $Q_5$, $Q_6$. It will be understood, however, that such duty cycle control may be achieved using any of a number of other switching devices and control signal generating circuits.

Preferably, each of the switching transistors $Q_1$, $Q_2$, $Q_3$, $Q_4$, $Q_5$, $Q_6$ of FIG. 4 is operated at a switching frequency that is relatively high with respect to the frequency of the AC input voltage $V_{AC}$ at which the UPS 400 operates. More preferably, each of the switching transistors $Q_1$, $Q_2$, $Q_3$, $Q_4$, $Q_5$, $Q_6$ is operated at a switching frequency that is at least 10 times higher than the frequency of the AC input voltage $V_{AC}$; for an AC line frequency of 60 Hz, a suitable switching frequency might be 20 kHz. Using relatively high switching frequencies allows the magnetic components (e.g., the inductors $L_1$, $L_2$, $L_3$) to be relatively small in size. Low pass filtering to produce a smoothed load voltage $V_{LOAD}$ may be achieved by the combination of the output inductor $L_2$ and the capacitance $C_L$. It will be appreciated that the output capacitance $C_L$ may be provided by the load 20, as illustrated in FIG. 4, or may be incorporated in the UPS 400.

Preferably, the three switching transistor pairs including the first and second transistors $Q_1$, $Q_2$, the third and fourth transistors $Q_3$, $Q_4$, and the fifth and sixth switches $Q_5$, $Q_6$ are operated in a "complementary" fashion. For example, the second transistor $Q_2$ of FIG. 4 is preferably generally constrained to be "off" when the first transistor $Q_1$ is "on," and vice versa. However, it will be appreciated that, generally, practical circuit implementations within the scope of the present invention may be used in which the "complementary" switches are operated in an approximately or substantially complementary fashion. For example, a switch pair may be operated in a "break before make" fashion, such that one of the switches in the pair is turned off slightly before the other switch in the pair is turned on. In other circuit implementations, a slight amount of overlap of "on" periods of switches of a complementary pair may be allowed, e.g., a "make before break" mode of operation. Techniques for providing such "make before break" and "break before make" operations are known to those of skill in the art, and will not be discussed in greater detail herein.

Referring to FIG. 8 in conjunction with FIG. 4., the rectifier circuit 410 and the DC source coupling circuit 430 are generally operated to produce first and second DC voltages $V_1$, $V_2$ at the first and second voltage busses 402a, 402b having sufficient magnitudes to enable the inverter circuit 420 to provide a nominal AC output voltage $V_{LOAD}$ at the load port 403 without discharging the battery 460 at the DC source port 431. Power preferably is primarily supplied from the AC source port 401, and the first and second transistors $Q_1$, $Q_2$ are modulated to maintain the first and second DC voltages $V_1$, $V_2$. An AC output at the load port 403 is obtained by action of the inverter circuit 410, which inverts the first and second DC voltages $V_1$, $V_2$ to produce the load voltage $V_{LOAD}$. If the first and second DC voltages $V_1$, $V_2$ are too high, the inverter circuit 420 can also provide a bucking function to provide a nominal voltage at the load port 403 through the action of the third and fourth transistors $Q_3$, $Q_4$ and the second inductor $L_2$.

If the AC source voltage $V_{AC}$ is sufficiently high, the rectifier circuit 410 may not need to provide a boost to maintain the first and second DC voltages $V_1$, $V_2$. During a first half-cycle 810, the first and second transistors $Q_1$, $Q_2$ can operate at substantially complementary duty cycles approaching 100% and 0%, respectively. During a second half-cycle 810, the first and second transistors $Q_1$, $Q_2$ can operate at substantially complementary duty cycles approaching 0% and 100%, respectively.

If the AC source voltage $V_{AC}$ falls, however, the duty cycles of the first and second transistors $Q_1$, $Q_2$ can be varied to provide an appropriate boost to the first and second DC voltages $V_1$, $V_2$. During the first half-cycle 810, the first and second transistors $Q_1$, $Q_2$ are operated at respective complementary duty cycles sufficiently less than 100% and sufficiently greater than 0%, respectively, to provide an appropriate boost to maintain the first DC voltage $V_1$ and, through the action of the balancer circuit 432, the second DC voltage $V_2$. During the second half-cycle 820, the first and second transistors $Q_1$, $Q_2$ are operated at respective complementary duty cycles sufficiently greater than 0% and sufficiently less than 100%, respectively, to provide an appropriate boost to maintain the second DC voltage $V_2$ and, through the action of the balancer circuit 432, the first DC voltage $V_1$.

Still referring to FIGS. 4 and 8, under conditions in which the battery 460 is frilly charged and power supplied at the AC source port 401 is sufficient to maintain a nominal voltage at the load port 403, a substantially zero net power flow occurs between the battery 460 and the first and second voltage busses 402a, 402b. The magnitude of current induced in the second winding $L_b$ through the first winding $L_a$ by the balancer circuit 432 varies throughout the cycle of the AC source voltage $V_{AC}$, causing the battery current $I_B$ (shown in FIG. 4) to fluctuate. If the internal electromotive force (EMF) generated by the battery 460 is sufficient such that this current is effectively offset by currents flowing from the battery 460 through DC-AC converter circuit 436, the average current $I_{B,avg}$ through the battery 460 is substantially zero, resulting in substantially zero net charge or discharge of the battery 460.

However, if the battery 460 is less that fully charged, i.e., if the internal EMF of the battery is low such that the battery acts to pull the voltage $V_{DC}$ at the DC source port lower, a net negative average battery current $I_{B,avg}$ produced by the DC source coupling circuit 430 acts to maintain the voltage $V_{DC}$ at the DC source port 431, i.e., charging current flows into the battery 460. Conversely, if power demand at the load port 403 tries to pull the first and second DC voltages $V_1$, $V_2$ lower, the DC source coupling circuit 430 acts to maintain the first and second voltages $V_1$, $V_2$ by drawing a positive average battery current $I_{B,avg}$, transferring power from the battery 460 to the first and second voltage busses 402a, 402b. Accordingly, the DC source coupling circuit 430 acts to maintain the first and second DC voltages $V_1$, $V_2$ (which are constrained to be substantially equal in magnitude by the balancer circuit 432) in a substantially fixed proportion to the voltage $V_{DC}$ at the DC source port 431, by effecting appropriate power transfers therebetween.

It will be understood that FIG. 8 is provided for illustrative purposes, and that embodiments of the present invention can operate in any of a number of ways than those described with reference to FIG. 8. For example, although FIG. 8 illustrates generating a load voltage $V_{LOAD}$ having the same frequency as the AC source voltage $V_{AC}$, the present invention is not limited to such same-frequency operation. Because the UPS 400 uses intermediate DC busses 402a, 402b to transfer power between the AC source port 401 and the load port 403, the AC source voltage $V_{AC}$ and the load voltage $V_{LOAD}$ can have different frequencies; for example, the AC source voltage $V_{AC}$ may be 50 Hz, while the generated load voltage $V_{LOAD}$ may be 60 Hz, or vice versa. The frequency of the load voltage $V_{LOAD}$ may be changed, for example, by varying the operations of the inverter circuit 420 from the operations described above, e.g., by modifying the rate at which duty cycles of the third and fourth transistors $Q_3$, $Q_4$ are changed to provide the desired output frequency.

The manner in which boost and/or buck is applied by the rectifier and inverter circuits 410, 420 may also be varied. For example, it may be desirable to elevate the first and second DC voltages $V_1$, $V_2$ at the first and second voltage busses 402a, 402b to achieve accelerated battery charging. Under such conditions, the duty cycles of the first, second, third and fourth transistors $Q_1$, $Q_2$, $Q_3$, $Q_4$ may be controlled such that the rectifier circuit 410 boosts the first and second DC voltages $V_1$, $V_2$, while the inverter circuit 420 bucks the load voltage $V_{LOAD}$ to maintain a desired nominal load voltage, thus allowing power to flow from the first and second voltage busses 402a, 402b to the DC source port 431 while maintaining nominal voltage at the load 20.

Figure 9A:
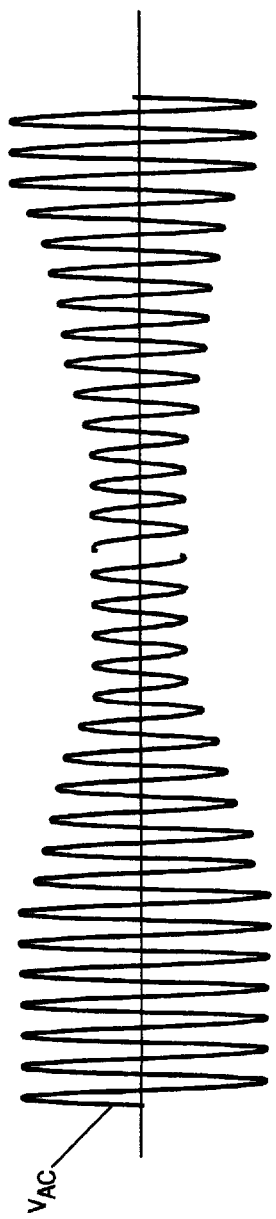
Figure 9B:
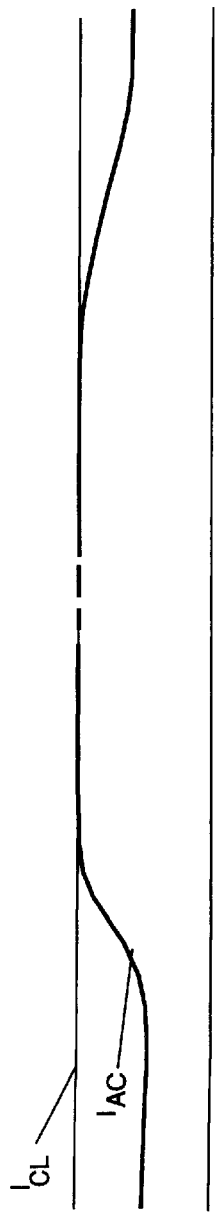
Figure 9C:
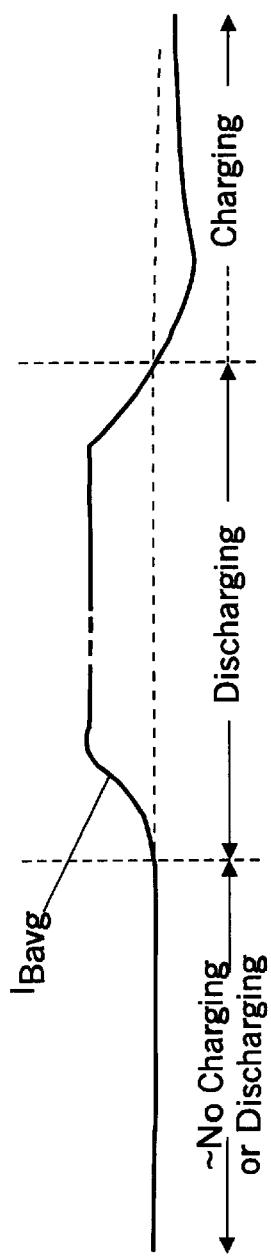

FIGS. 9A–9C illustrate exemplary operations of the UPS 400 of FIG. 4 during a "brownout" condition, i.e., when the AC source voltage $V_{AC}$ falls to a point to where the AC source 10 can no longer meet the power demand at the load port 403. Referring to FIGS. 9A–9C in conjunction with FIG. 4, as the AC source voltage $V_{AC}$ drops, the rectifier circuit 410 attempts to boost the first and second voltages $V_1$, $V_2$ at the first and second voltage busses 402a, 402b by drawing increased current $I_{AC}$ from the AC source 10 (as shown, $I_{AC}$ represents a current magnitude for an AC current). A current limit $I_{CL}$ may be determined by characteristics of the AC source 10, characteristics of components of the rectifier circuit 410, and/or by constraints imposed on operation of the rectifier circuit 410 by the control circuit 440 (e.g., the control circuit 440 may act to limit current responsive to sensing the AC input current $I_{AC}$). As the current $I_{AC}$ approaches the current limit $I_{CL}$, increasing power may be drawn from the battery 460, i.e., a positive battery current $I_B$ may be produced such that both the battery 460 and the AC source 10 are supplying power to the load port 403. If the AC input voltage $V_{AC}$ continues to decline, the AC input current $I_{AC}$ may eventually drop off to zero (not shown), as the AC source 10 may no longer be capable of supplying power, or the UPS 400 may activate an AC switch (not shown) to disconnect the AC source 10 from the rectifier circuit 410. Under such dropout conditions, power to the load port 403 may be exclusively provided by the battery 460, such that the UPS 400 changes from a battery-supplemented mode of operation to a battery-powered mode of operation. After restoration of the AC source voltage $V_{AC}$, the battery current $I_B$ (shown in FIG. 4) may be reduced, and may even go negative as the UPS 400 attempts to replenish energy drawn from the battery 460 during the brownout period.

The above-described operations may be particularly advantageous in extending battery capacity. Many conventional UPSs go into an offline mode of operation under brownout conditions, i.e., when the voltage of the AC power source (utility) drops below a nominal level, the UPS disconnects the AC power source and supplies the load solely from a battery, which can result in quick discharge of the battery. The aspect of the present invention described with reference to FIGS. 9A–9C arises from the realization that a significant amount of power may still be available at the AC power source during a brownout, and that this power can be combined with power drawn from the battery to lessen the rate of discharge of the battery during such low-voltage conditions. Thus, for example, a UPS according to the present invention may be capable of operating through longer brownout conditions than comparable conventional UPSs, and may preserve more battery capacity for continued operation if a brownout is followed by a total loss of the AC power source.

Figure 10:
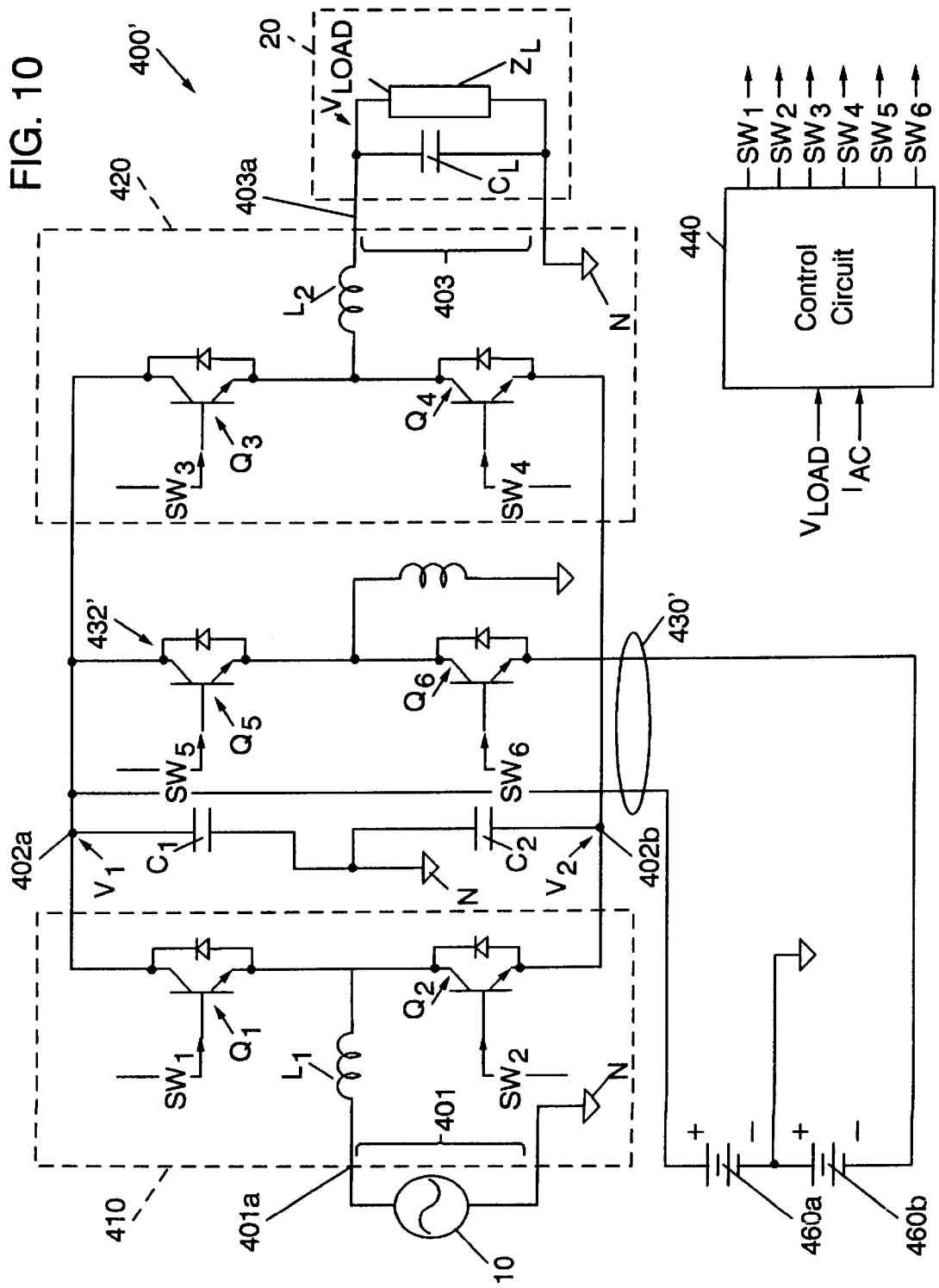
FIG. 10 is a schematic diagram illustrating a UPS according to another embodiment of the present invention.

Although the circuit configurations and operations described with reference to FIGS. 4–8 and 9A–9C are preferred, other circuit configurations and operations fall within the scope of the present invention. For example, FIG. 10 illustrates a UPS 400' according to an alternative embodiment of the present invention. Like elements of FIGS. 4 and 10 are indicated by like reference numerals, and will not be discussed in detail in light of the preceding discussion of FIG. 4. The UPS 400' differs from the UPS 400 of FIG. 4 in that the inductive DC source coupling circuit 430 of FIG. 4 is replaced with a direct DC source coupling circuit 430', here shown as conductors that directly couple a DC power source, here shown as batteries 460a, 460b, to the first and second voltage busses 402a, to provide bidirectional power transfer between the DC power source 460a, 460b and the first and second voltage busses 402a, 402b. The balancer circuit 432 of FIG. 4 is replaced with a balancer circuit 432' in which the fifth and six transistors $Q_5$, $Q_6$ selectively couple the first and second voltage busses 402a, 402b to the neutral bus N via a third inductor $L_3$.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An uninterruptible power supply (UPS), comprising:
   an AC source port configured to connect to an AC power source;
   a load port configured to connect to a load;
   a rectifier circuit that selectively couples the AC source port to first and second voltage busses through a first inductance;
   an inverter circuit that selectively couples the load port to the first and second voltage busses through a second inductance; and
   a bidirectional DC source coupling circuit operative to couple a DC power source to the first and second voltage busses to provide bidirectional power transfer between the DC power source and the first and second voltage busses.

2. A UPS according to claim 1, further comprising a DC source port configured to connect to a DC power source, and wherein the bidirectional DC source coupling circuit inductively couples the DC source port to the first and second voltage busses to provide bidirectional power transfer between the DC source port and the first and second voltage busses such that a voltage at the DC source port is maintained in a substantially fixed proportion to first and second DC voltages at respective ones of the first and second voltage busses.

3. A UPS according to claim 2, further comprising a control circuit operative to generate a rectifier control signal and an inverter control signal responsive to at least a load voltage at the load port, wherein the rectifier circuit is responsive to the rectifier control signal to control coupling of the AC source port to the first and second voltage busses, and wherein the inverter circuit is responsive to the inverter control signal to control coupling of the load port to the first and second voltage busses.

4. A UPS according to claim 3:
   wherein the AC source port comprises a phase bus and a neutral bus;
   wherein the bidirectional DC source coupling circuit comprises a balancer circuit coupled between the first and second voltage busses and operative to selectively couple the first and second voltage busses to the neutral bus through a transformer responsive to a balancer control signal; and
   wherein the control circuit is operative to generate the balancer control signal such that the first and second DC voltages are constrained to have substantially equal magnitudes.

5. A UPS according to claim 3, wherein the control circuit is responsive to the voltage at the load port to control the rectifier circuit and the inverter circuit such that current at the AC source port varies up to a current limit to maintain the load voltage at the nominal voltage, and such that, when the current at the AC source port reaches the current limit and the voltage, power is transferred to the load port from both the AC source port and the DC source port to maintain the load terminal at the nominal voltage.

6. A UPS according to claim 5, wherein the control circuit is operative to limit the current at the AC source port.

7. A UPS according to claim 3:
   wherein the AC source port comprises a phase bus and a neutral bus;
   wherein the load port comprises a load bus and the neutral bus; and
   wherein the control circuit is operative to control the rectifier circuit and the inverter circuit such that the phase bus is coupled to respective ones of the first and second voltage busses in a substantially complementary manner and such that the load bus is coupled to respective ones of the first and second voltage busses in a substantially complementary manner.

8. A UPS according to claim 3:
   wherein the AC source port comprises a phase bus and a neutral bus;
   wherein the load port comprises a load bus and the neutral bus; and
   wherein the rectifier circuit comprises:
      a first inductor having a first terminal coupled to the phase bus;
      a first switch responsive to a first switch control signal to couple and decouple a second terminal of the first inductor and the first voltage bus; and
      a second switch responsive to a second switch control signal to couple and decouple the second terminal of the first inductor and the second voltage bus; wherein the inverter circuit comprises:
a second inductor having a first terminal coupled to the load bus;
a third switch responsive to a third switch control signal to couple and decouple a second terminal of the second inductor and the first voltage bus; and
a fourth switch responsive to a fourth switch control signal to couple and decouple the second terminal of the second inductor and the second voltage bus; and wherein the control circuit is operative to generate the first, second, third and fourth switch control signals responsive to at least the load voltage at the load port.

9. A UPS according to claim 8, wherein the control circuit operates the first and second switches at substantially complementary duty cycles, and wherein the control circuit operates the third and fourth switches at substantially complementary duty cycles.

10. A UPS according to claim 2:
wherein the AC source port comprises a phase bus and a neutral bus;
wherein the load port comprises a load bus and the neutral bus; and
wherein the bidirectional DC source coupling circuit comprises:
a transformer having first and second inductively coupled windings, the first winding having first and second end taps and a center tap coupled to the neutral bus;
a switching circuit operative to selectively couple the first end tap of the first winding to the first and second voltage busses;
a rectifying circuit coupling the second end tap of the first winding to the first and second voltage busses; and
a bidirectional DC-AC converter circuit coupled between the second winding and the DC source port.

11. A UPS according to claim 10, wherein the switching circuit is operative to constrain the first and second DC voltages to be substantially equal.

12. A UPS according to claim 10, further comprising a control circuit operative to generate first and second control signals, and wherein the switching circuit comprises:
a first switch responsive to the first switch control signal to couple and decouple the first end tap of the first winding of the transformer and the first voltage bus; and
a second switch responsive to the second switch control signal to couple and decouple the first end tap of the first winding of the transformer and the second voltage bus.

13. A UPS according to claim 12, wherein the control circuit constrains the first and second switches to operate at substantially complementary duty cycles of approximately 50%.

14. A UPS according to claim 10, wherein the DC-AC converter circuit comprises a full bridge switching circuit that selectively couples first and second terminals of the DC source port to first and second taps of the second winding of the transformer.

15. A UPS according to claim 10, wherein the rectifying circuit comprises one of:
first and second diodes connected between the second end tap of the first winding of the transformer and respective ones of the first and second voltage busses; or seventh and eighth switches connected between the second end tap of the first winding of the transformer and respective ones of the first and second voltage busses.

16. An uninterruptible power supply (UPS), comprising:
an AC source port configured to connect to an AC power source, the AC source port including a phase bus and a neutral bus;
a DC source port configured to connect to a DC power source;
a load port configured to connect to a load, the load port including a load bus and the neutral bus;
first and second voltage busses;
a first switching circuit that selectively couples the phase bus to the first and second voltage busses through a first inductance;
a second switching circuit that selectively couples the load bus to the first and second voltage busses through a second inductance;
a transformer including first and second inductively coupled windings, the first winding including a center tap coupled to the neutral bus;
a third switching circuit that selectively couples the first and second voltage busses to a first end tap of the first winding;
a rectifying circuit that rectifyingly couples a second end tap of the first winding to the first and second voltage busses; and
a DC-AC converter circuit that selectively couples the DC source port to the second winding.

17. A UPS according to claim 16, further comprising a control circuit operative to control the first and second switching circuits responsive to at least a load voltage at the load port.

18. A UPS according to claim 17, wherein the control circuit is operative to control the third switching circuit such that first and second DC voltages at respective ones of the first and second voltage busses are constrained to have substantially equal magnitudes.

19. A UPS according to claim 17, wherein the control circuit is responsive to the voltage at the load port to control the first and second switching circuits such that current at the phase bus varies up to a current limit to maintain the load voltage at the nominal voltage, and such that, when the current at the phase bus reaches the current limit, power is transferred to the load port from both the AC source port and the DC source port to maintain the load terminal at the nominal voltage.

20. A UPS according to claim 19, wherein the control circuit is operative to limit the current at the phase bus.

21. A UPS according to claim 17, wherein the control circuit is operative to control the first and second switching circuits such that the phase bus is coupled to respective ones of the first and second voltage busses in a substantially complementary manner and such that the load bus is coupled to respective ones of the first and second voltage busses in a substantially complementary manner.

22. A UPS according to claim 17:
wherein the first switching circuit comprises:
a first inductor having a first terminal coupled to the phase bus;
a first switch responsive to a first switch control signal to couple and decouple a second terminal of the first inductor and the first voltage bus; and
a second switch responsive to a second switch control signal to couple and decouple the second terminal of the first inductor and the second voltage bus;

wherein the second switching circuit comprises:
  a second inductor having a first terminal coupled to the load bus;
  a third switch responsive to a third switch control signal to couple and decouple a second terminal of the second inductor and the first voltage bus; and
  a fourth switch responsive to a fourth switch control signal to couple and decouple the second terminal of the second inductor and the second voltage bus; and
wherein the control circuit is operative to generate the first, second, third and fourth switch control signals responsive to at least the load voltage at the load port.

23. A UPS according to claim 22, wherein the control circuit operates the first and second switches at substantially complementary duty cycles, and wherein the control circuit operates the third and fourth switches at substantially complementary duty cycles.

24. A UPS according to claim 22:
wherein the third switching circuit comprises:
  a fifth switch responsive to a fifth switch control signal to couple and decouple the first end tap of the first winding of the transformer and the first voltage bus; and
  a sixth switch responsive to a sixth switch control signal to couple and decouple the first end tap of the first winding of the transformer and the second voltage bus; and
wherein the control circuit is operative to generate the fifth and sixth switch control signals.

25. A UPS according to claim 24, wherein the control circuit constrains the fifth and sixth switches to operate at substantially complementary duty cycles of approximately 50%.

26. A UPS according to claim 16, wherein the DC-AC converter circuit comprises a full bridge switching circuit that selectively couples first and second terminals of the DC source port to first and second taps of the second winding of the transformer.

27. A UPS according to claim 16, wherein the rectifying circuit comprises one of:
  first and second diodes connected between the second end tap of the first winding of the transformer and respective ones of the first and second voltage busses; or
  first and second switches connected between the second end tap of the first winding of the transformer and respective ones of the first and second voltage busses.

28. A method of selectively transferring power to a load from an AC source and a DC source, the method comprising the steps of:
  selectively coupling the AC source to first and second voltage busses through a first inductance;
  selectively coupling the load to the first and second voltage busses through a second inductance; and
  bidirectionally coupling the DC source to the first and second voltage busses to provide bidirectional power transfer between the DC source and the first and second voltage busses.

29. A method according to claim 28, wherein said step of bidirectionally coupling comprises the step of inductively coupling the DC source to the first and second voltage busses to provide bidirectional power transfer between the DC source and the first and second voltage busses such that a voltage at the DC source is maintained in a substantially fixed proportion to first and second DC voltages at respective ones of the first and second voltage busses.

30. A method according to claim 29, further comprising the step of selectively coupling the first and second voltage busses to a neutral bus through a transformer such that the first and second DC voltages are constrained to have substantially equal magnitudes.

31. A method according to claim 30, further comprising the steps of:
  selectively coupling the AC source port to the first and second voltage busses such that current at the AC source varies up to a current limit to maintain the load voltage at the nominal voltage; and
  when the current at the AC source port reaches the current limit and the voltage, transferring power to the load port from both the AC source and the DC source to maintain the load voltage at the nominal voltage.

32. A method according to claim 29:
wherein said step of selectively coupling the AC source comprises the step of selectively coupling a phase bus of the AC source to respective ones of the first and second voltage busses in a substantially complementary manner; and
wherein said step of selectively coupling the load comprises the step of selectively coupling the load to respective ones of the first and second voltage busses in a substantially complementary manner.

33. A method according to claim 30 wherein said step of bidirectionally coupling comprises the steps of:
  selectively coupling the neutral bus to the first and second voltage busses through a first portion of a first winding of a transformer having first and second inductively coupled windings;
  rectifyingly coupling the first and second voltage busses to the neutral bus through a second portion of the first winding of the transformer;
  selectively coupling first and second terminals of the DC source to first and second end taps of the second winding of the transformer.

* * * * *